United States Patent
Obata et al.

(10) Patent No.: US 7,323,252 B2
(45) Date of Patent: Jan. 29, 2008

(54) BIAXIALLY ORIENTED MULTILAYER POLYPROPYLENE FILM

(75) Inventors: Yoichi Obata, Sodegaura (JP); Hideaki Hori, Sodegaura (JP); Takeshi Ebara, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 219 days.

(21) Appl. No.: 11/118,764

(22) Filed: May 2, 2005

(65) Prior Publication Data

US 2005/0249963 A1 Nov. 10, 2005

(30) Foreign Application Priority Data

May 6, 2004 (JP) ............................. 2004-137155

(51) Int. Cl.
*B32B 27/32* (2006.01)
(52) U.S. Cl. ..................................... 428/516
(58) Field of Classification Search ................ 428/515, 428/516

See application file for complete search history.

(56) References Cited

U.S. PATENT DOCUMENTS

| | | | |
|---|---|---|---|
| 5,331,054 A | 7/1994 | Fujita et al. | |
| 5,569,693 A * | 10/1996 | Doshi et al. | 524/317 |
| 6,117,553 A * | 9/2000 | Hayashida et al. | 428/412 |
| 6,682,822 B2 * | 1/2004 | Cretekos et al. | 428/447 |
| 6,958,193 B2 * | 10/2005 | Itaya et al. | 428/516 |
| 7,041,742 B2 * | 5/2006 | Panek et al. | 525/240 |
| 2002/0160170 A1 * | 10/2002 | Ishige et al. | 428/220 |
| 2005/0249963 A1 * | 11/2005 | Obata et al. | 428/523 |

FOREIGN PATENT DOCUMENTS

| | | |
|---|---|---|
| JP | 5-104688 | 4/1993 |
| JP | 5-112682 | 5/1993 |
| JP | 10-16153 | 1/1998 |
| JP | 2002-248719 | 9/2002 |
| JP | 2006 289867 | * 10/2006 |

* cited by examiner

*Primary Examiner*—D. Lawrence Tarazano
(74) *Attorney, Agent, or Firm*—Foley & Lardner LLP

(57) ABSTRACT

Disclosed is a biaxially oriented multilayer polypropylene film which has a substrate layer containing a polypropylene resin composition including 97 to 99.97% by weight of a propylene polymer (A) and 0.03 to 3% by weight of a surfactant and also has, on at least one side of this layer, a layer containing a polypropylene resin composition including 30 to 80% by weight of a propylene polymer (C) having a melting point of 150 to 170° C. and 20 to 70% by weight of a propylene-based random copolymer (D) having a melting point of 120 to 149° C. and including 1 to 14 mole % of ethylene and/or α-olefin.

1 Claim, No Drawings

BIAXIALLY ORIENTED MULTILAYER POLYPROPYLENE FILM

BACKGROUND OF THE INVENTION

1. Field of the Invention

The present invention relates to biaxially oriented multilayer polypropylene films. More particularly, the invention relates to biaxially oriented multilayer polypropylene films having extremely slight stretching unevenness and being superior in transparency, see-through feeling, hot slip property, rigidity, heat resistance, durability of antistatic property and printability.

2. Description of the Related Art

Biaxially oriented polypropylene films are used in a wide variety of applications such as food packaging applications and textile packaging applications because of their superior optical characteristics such as transparency, see-through feeling and luster, mechanical characteristics such as tensile strength and rigidity, and moisture barrier properties. Biaxially oriented polypropylene films, however, are likely to have static electricity and may suffer from adhesion of dust to their surface or defective fixation of ink to their surface at the time of printing. As biaxially oriented polypropylene films having improved antistatic properties, films such as those shown below are known.

Japanese Patent Application Laid-Open (JP-A) No. 5-104688 discloses a biaxially oriented composite polypropylene film that comprises a base layer of polypropylene with a density of 0.9070 g/cm$^3$ containing an antistatic agent and a polypropylene layer laminated on one or both sides of the base layer. Specifically, disclosed is a biaxially oriented composite film produced by using polypropylene homopolymer for forming both a base layer and a surface layer and stretching an intermediate laminate transversely at a stretch ratio of 10 at a stretching temperature of 166° C.

JP-A No. 5-112682 (also issued as U.S. Pat. No. 5,331,054) discloses a biaxially oriented multilayer polypropylene film that has a surface layer formed of a polypropylene composition which contains a propylene polymer with a molecular weight distribution of 3 or less obtained in the presence of a catalyst comprising a metallocene compound and alumoxane, and a propylene-based random copolymer with a molecular weight distribution of 3.5 to 10 obtained in the presence of a Ziegler type catalyst. Specifically, disclosed is a biaxially oriented multilayer polypropylene film which has a surface layer formed of a composition containing, as the propylene polymer obtained in the presence of a catalyst comprising a metallocene compound and alumoxane, (i) a propylene polymer whose DSC chart has twin peaks at 141.0° C. and 135.7° C., (ii) a propylene polymer whose DSC chart has twin peaks at 134.2° C. and 127.0° C., or (iii) a propylene polymer having a melting point of 135.2° C., the film being obtained by stretching an intermediate sheet laterally at 168° C.

JP-A No. 10-16153 discloses a laminated film that comprises: a biaxially oriented polyolefin film which comprises a propylene homopolymer and/or propylene-α-olefin copolymer having an isotactic pentad fraction of 0.83 to 0.93 and a surfactant incorporated therein, and a surface layer which comprises a propylene homopolymer and/or a propylene-α-olefin copolymer having a content of α-olefin other than propylene of 8 mole % or less and a polyolefin having a content of α-olefin having 4 or more carbon atoms of 15 mole % or more, the surface layer being laminated on at least one surface of the polyolefin film.

JP-A No. 2002-248719 discloses a biaxially oriented multilayer polypropylene film which comprises a substrate layer having a surface layer laminated on at least one surface thereof. The substrate layer comprises an antistatic agent and polypropylene which has a cold xylene-soluble fraction content of less than 1.5% by weight and a melt flow rate of 0.5 to 20 g/10 min. and in which a melting point (Tm, ° C.) determined on the basis of a DSC chart and a cold xylene-soluble fraction content (CXS, % by weight) satisfy the following formula (I):

$$2(CXS)+152 \leq Tm \leq 2(CXS)+159 \qquad (I).$$

The surface layer is formed of, polypropylene which has a cold xylene-soluble fraction content not less than 2% by weight and a melt flow rate of 0.5 to 20 g/10 min. and in which a melting point (Tm, ° C.) determined on the basis of a DSC chart and a cold xylene-soluble fraction content (CXS, % by weight) satisfy the following formula (II):

$$2(CXS)+148 \leq Tm \leq 2(CXS)+155 \qquad (II).$$

Specifically, disclosed is a multilayer biaxially oriented polypropylene film obtained by using a propylene-ethylene random copolymer having an ethylene content of 0.6% by weight and a melting point of 158.0° C. as a surface layer and stretching an intermediate film transversely at a stretching temperature of 162° C.

SUMMARY OF THE INVENTION

Under such circumstances, an object of the present invention is to provide biaxially oriented multilayer polypropylene films having extremely slight stretching unevenness and being superior in transparency, see-through feeling, hot slip property, rigidity, heat resistance, durability of antistatic property, and printability.

In one aspect of the present invention, provided is a biaxially oriented multilayer polypropylene film which comprises a substrate layer comprising a polypropylene resin composition (I) defined below and a layer comprising a polypropylene resin composition (II) defined below, the layer comprising the polypropylene resin composition (II) being laminated on at least one surface of the substrate layer:

polypropylene resin composition (I): a polypropylene resin composition comprising 97 to 99.97% by weight of a propylene polymer (A) and 0.03 to 3% by weight of a surfactant (B), wherein the amounts expressed in % by weight are each based on the combined weight of the components (A) and (B);

polypropylene resin composition (II): a polypropylene resin composition comprising 30 to 80% by weight of a propylene polymer (C) satisfying requirement (a) defined below and 20 to 70% by weight of a random copolymer (D) satisfying requirements (b) and (c) defined below, the random copolymer (D) being selected from the group consisting of random copolymers of propylene and ethylene, random copolymers of propylene and α-olefin and random copolymers of propylene, ethylene and α-olefin, wherein the amounts expressed in % by weight are each based on the combined weight of the components (C) and (D);

requirement (a): having a melt point of 150 to 170° C., requirement (b): having a melt point of 120 to 149° C., requirement (c): having a content of ethylene, a content of α-olefin or a combined content of ethylene and α-olefin is 1 to 14 mole %.

The present invention successfully provides biaxially oriented multilayer polypropylene films can be obtained which have extremely slight stretching unevenness (in other words, have approximately no thickness unevenness) and are superior in transparency, see-through feeling, hot slip property, rigidity, heat resistance, durability of antistatic property, and printability.

DESCRIPTION OF THE PREFERRED EMBODIMENTS

In the present invention, the propylene polymer (A) is composed of at least one polymer selected from the group consisting of propylene homopolymers and propylene-based random copolymers.

Examples of the propylene-based random copolymers to be used as the propylene polymer (A) include random copolymers of made up of propylene and at least one copolymerizable monomer selected from the group consisting of ethylene and α-olefins having 4 to 20 carbon atoms; the random copolymers include random copolymers made up of propylene and ethylene, random copolymers made up of propylene and at least one α-olefin having 4 to 20 carbon atoms, and random copolymers made up of propylene, ethylene and at least one α-olefin having 4 to 20 carbon atoms.

Hereinafter, random copolymers made up of propylene and ethylene are referred to as "propylene-ethylene random copolymers." Random copolymer made up of propylene and at least one α-olefin are referred to as "propylene-α-olefin random copolymers." The random copolymers made up of propylene, ethylene and at least one α-olefin are referred to as "propylene-ethylene-α-olefin random copolymers."

Examples of the α-olefin having 4 to 20 carbon atoms include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene. Preferred are 1-butene, 1-pentene, 1-hexene and 1-octene. In particular, from the viewpoints of reduction in stretching unevenness in oriented films and heat resistance of oriented films, 1-butene and 1-hexene are more preferred.

Examples of the propylene-based random copolymers to be used as the propylene polymer (A) include propylene-ethylene random copolymers, propylene-α-olefin random copolymers and propylene-ethylene-α-olefin random copolymers. Examples of the propylene-α-olefin random copolymers include propylene-1-butene random copolymers, propylene-1-hexene random copolymer and propylene-1-octene random copolymers. Examples of the propylene-ethylene-α-olefin random copolymers include propylene-ethylene-1-butene random copolymers, propylene-ethylene-1-hexene random copolymer and propylene-ethylene-1-octene random copolymers. The propylene-based random copolymers preferably include propylene-ethylene random copolymers, propylene-1-butene random copolymers, propylene-1-hexene random copolymers, propylene-ethylene-1-butene random copolymers and propylene-ethylene-1-hexene random copolymers. In view of reduction in stretching unevenness of oriented films, even more preferred are propylene-ethylene random copolymers, propylene-1-butene random copolymers and propylene-ethylene-1-butene random copolymers. In view of heat resistance of oriented films, particularly preferred are propylene-1-butene random copolymers.

The ethylene content of the propylene-ethylene random copolymers to be used as the propylene polymer (A) is desirably 0.1 to 3 mole %, more desirably 0.2 to 2 mole % and, even more desirably 0.6 to 1.2 mole % from the viewpoint of reduction in stretching unevenness of oriented films or the viewpoint of rigidity of oriented films.

The α-olefin content of the propylene-α-olefin random copolymers to be used as the propylene polymer (A) is desirably 0.1 to 10 mole %, more desirably 0.2 to 8 mole % and, even more desirably 1 to 4 mole % from the viewpoint of reduction in stretching unevenness of oriented films or the viewpoint of rigidity of oriented films.

The combined content of ethylene and α-olefin of the propylene-ethylene-α-olefin random copolymers to be used as the propylene polymer (A) is desirably 0.1 to 10 mole %, more desirably 0.2 to 8 mole % and, even more desirably 0.4 to 2 mole % from the viewpoint of reduction in stretching unevenness of oriented films or the viewpoint of rigidity of oriented films.

When a mixture of a propylene homopolymer and a propylene-based random copolymer is used as the propylene polymer (A), the content of the propylene homopolymer is preferably from 2 to 80% by weight, and more preferably 6 to 70% by weight, and even more preferably 5 to 19% by weight from the viewpoint of reduction in stretching unevenness of oriented films or the viewpoint of rigidity of oriented films. In other words, the content of the propylene-based random copolymer is preferably 20 to 98% by weight, more preferably 30 to 94% by weight, and even more preferably 81 to 95% by weight. Note that the aforementioned amounts expressed in % by weight are each based on the combined weight of the propylene homopolymer and the propylene-based random copolymer.

When a mixture of a propylene homopolymer and a propylene-based random copolymer is used as the propylene polymer (A), the ratio of the melting point of the propylene-based random copolymer, expressed by $Tm^{42}$, to that of the propylene homopolymer, expressed by $Tm^{41}$, namely a $Tm^{42}$ to $Tm^{41}$ ratio, is desirably less than 1, more desirably up to 0.99, and even more desirably up to 0.98 from the viewpoint of rigidity of oriented films or the viewpoint of reduction in stretching unevenness of oriented films. It should be noted that, in the present invention, the melt point of a polymeric material is expressed by Tm (° C.) and this means a temperature at which a highest endothermic peak appears in the differential scanning calorimetry (DSC) measurement of the material. This definition is applied not only to the propylene polymer (A) but also to polypropylene resin composition (I), propylene polymer (C), random copolymer (D) and polypropylene resin composition (II) each described below.

When a mixture of a propylene homopolymer and a propylene-based random copolymer is used as the propylene polymer (A), the ratio of the intrinsic viscosity of the propylene-based random copolymer, expressed by $[\eta]^{42}$, to that of the propylene homopolymer, expressed by $[\eta]^{41}$, namely a $[\eta]^{42}$ to $[\eta]^{41}$ ratio, is desirably more than 1 but less than 10, more desirably from 1.2 to 9, and even more desirably from 1.4 to 8 from the viewpoint of rigidity of oriented films or the viewpoint of reduction in stretching unevenness of oriented films.

From the viewpoint of heat resistance of oriented films, the propylene polymer (A) desirably is a mixture of a propylene homopolymer and a propylene-based random copolymer. Moreover, from the viewpoint of reduction in stretching unevenness of oriented films or the viewpoint of heat resistance of oriented films, a mixture of a propylene homopolymer and a propylene-1-butene random copolymer is more desirable.

It is possible to prepare the propylene polymer (A) using a conventional polymerization catalyst and a conventional polymerization technique.

Examples of the conventional polymerization catalyst include catalyst systems comprising a solid catalyst component comprising magnesium, titanium and halogen, an organoaluminum compound and, if necessary, a third component such as an electron-donating compound; catalyst systems comprising a Group IV transition metal compound having a cyclopentadienyl ring and alkyl aluminoxane; and catalyst systems comprising a Group IV transition metal compound having a cyclopentadienyl ring, a compound capable of reacting with the Group IV transition metal compound to form an ionic complex and an organoaluminum compound. Preferred are catalyst systems comprising a solid catalyst compound comprising magnesium, titanium and halogen, an organoaluminum compound and an electron-donating compound, for example, catalyst systems disclosed in JP-A Nos. 61-218606, 61-287904, 1-319508 and 7-216017.

Examples of the conventional polymerization technique include slurry polymerization and solvent polymerization which are conducted in the presence of an inert hydrocarbon solvent, liquid phase polymerization which is conducted in the absence of solvent, and gas phase polymerization. Gas phase polymerization is preferred. Moreover, combinations of the foregoing polymerization techniques and their successive combinations such as liquid phase-gas phase polymerization are available.

As the surfactant (B), conventional surfactants may be used such as cationic surfactants, anionic surfactants, nonionic surfactants and amphoteric surfactants.

Examples of cationic surfactants include primary amine salts, tertiary amines, quaternary ammonium compounds and alkyl pyridium salts.

Examples of anionic surfactants include sulfonated oil, sulfonated amide oil, sulfonated ester oil, fatty alcohol sulfuric ester salts, alkylsulfuric ester salts, fatty acid ethylsulfonic acid salts, alkylsulfonic acid salts, alkylbenzenesulfonic acid salts, and phosphoric ester salts.

Examples of nonionic surfactants include partial fatty acid esters of polyhydric alcohols, ethylene oxide adducts of fatty alcohols, ethylene oxide adducts of fatty amines or fatty amides, ethylene oxide adducts of alkylphenols, ethylene oxide adducts of alkylnaphthols, alkyl alcohols, polyethylene glycols, alkyldiethanolamines and their fatty acid esters, alkyldiethanolamides, polyoxyethylene alkyl ethers, polyoxyethylene alkyl phenyl ethers, polyoxyethylene alkylphenol esters, glycerol fatty acid esters, polyglycerol fatty acid esters, pentaerythritol fatty acid esters, polyoxyethylene fatty acid esters, sorbitan fatty acid esters, polyoxyethylene sorbitan fatty acid esters, and polyoxyethylenealkylamines and their fatty acid esters.

Examples of amphoteric surfactants include carboxylic acid derivatives and imidazoline derivatives.

Other examples include saturated fatty acid amides such as stearamide and behenamide, unsaturated fatty acid amides such as oleamide and erucamide, bisfatty acid amides such as ethylenebis stearamide, stearic acid and butyl stearate.

These surfactants may use alone or in combination of two or more of them.

Preferable examples of surfactant (B) include nonionic surfactants such as alkyl alcohols, partial fatty acid esters of polyhydric alcohols, glycerol monofatty acid esters, alkyldiethanol amines and their fatty acid esters, alkyldiethanolamides, polyoxyethylenealkylamines and their fatty acid esters. Particularly preferred are glycerol monofatty acid esters, alkyldiethanolamines, alkyldiethanolamine fatty acid esters and their mixtures.

From the viewpoints of durability of antistatic property of oriented films or the viewpoint of fuming or fouling of rolls during the production of oriented films, the polypropylene resin composition (I) contains 97 to 99.97% by weight of the propylene polymer (A) and 0.03 to 3% by weight of the surfactant (B), preferably 98 to 99.9% by weight of the propylene polymer (A) and 0.1 to 2% by weight of the surfactant (B), and more preferably 98.5 to 99.5% by weight of the propylene polymer (A) and 0.5 to 1.5% by weight of the surfactant (B). Note that the amounts expressed in % by weight are each based on the combined weight of the components (A) and (B).

If the content of the surfactant (B) is less than 0.03% by weight, the durability of antistatic property may be insufficient. If it is more than 3% by weight, fuming or fouling of rolls may occur during the production of oriented films.

As the method for mixing the propylene polymer (A) and the surfactant (B), any method by which the surfactant (B) can be dispersed uniformly in the propylene polymer (A) may be employed. One example of such methods is a method which comprises mixing the propylene polymer (A) and the surfactant (B) in a mixing device such as a ribbon blender, a Henschel mixer and a tumbler mixer and melt-kneading the resulting mixture in an extruder. Another example is a method which comprises preparing a masterbatch including 100 parts by weight of propylene polymer (A) and 1 to 100 parts by weight of surfactant (B) and mixing the masterbatch with an appropriate amount of propylene polymer (A) so as to adjust the concentration of the surfactant (B) to a predetermined value.

The melt flow rate (hereinafter, MFR) of the polypropylene resin composition (I) desirably is 0.1 to 20 g/10 min., more desirably 1 to 10 g/10 min., and even more desirably 2 to 4 g/10 min. from the viewpoint of simultaneous achievement of good fluidity at the time of extrusion processing and reduction in stretching unevenness of oriented films. The MFR is measured at a temperature of 230° C. and a load of 21.18 N in accordance with Condition 14 provided in JIS K 7210.

From the viewpoint of simultaneous achievement of good heat resistance and reduction in stretching unevenness of oriented films, the melting point of the polypropylene resin composition (I) is preferably 150 to 164° C., more preferably 155 to 163° C., and even more particularly 157 to 160° C.

It is possible to adjust the melt point of the polypropylene resin composition (I) within the above ranges by (i) regulating the stereoregularity of the propylene polymer (A) through modification of a polymerization catalyst for use in the production of the propylene polymer (A), (ii) when the propylene polymer (A) is a propylene-based random copolymer, regulating the proportions of the monomers to be copolymerized, or (iii) when the propylene polymer (A) is a mixture of a propylene homopolymer and a propylene-based random copolymer, regulating the proportions of these polymers to be mixed.

From the viewpoint of simultaneous achievement of good heat resistance and good durability of antistatic property, the cold xylene-soluble fraction content in the polypropylene resin composition (I) desirably is 0.1 to 7% by weight, more desirably 0.2 to 6% by weight, and even more desirably 0.3 to 5% by weight.

In the present invention, a cold-xylene soluble fraction content of a polymeric material, which includes homopolymers, copolymers and their compositions, means the content, expressed in % by weight, of the polymeric material's component(s) soluble in xylene at 20° C. The cold xylene-soluble fraction content may, hereinafter, be abbreviated as CXS. The CXS is measured in the following manner. First, 10 g of sample (polymeric material) is dissolved in 1000 ml of boiling xylene and then the solution is cooled to 50° C. slowly. Subsequently, the solution is cooled to 20° C. in iced water under stirring and then is left standing at 20° C. overnight. The polymer precipitated is removed by filtration and then xylene is removed by distillation from the filtrate. The distillation residue is dried under reduced pressure at 60° C. and then recovered. The weight, W (g), of the recovery is measured. The value of the formula (W/10)×100 is used as a cold xylene-soluble fraction content (CXS). The definition and the measuring method of CXS are applied not only to the polypropylene resin composition (I) but also to the propylene polymer (C) and the polypropylene resin composition (II) described below.

The CXS of the polypropylene resin composition (I) can be adjusted within the above ranges by (i) regulating the stereoregularity of the propylene polymer (A) through modification of a polymerization catalyst for use in the production of the propylene polymer (A), (ii) when the propylene polymer (A) is a propylene-based random copolymer, regulating the proportions of the monomers to be copolymerized, or (iii) when the propylene polymer (A) is a mixture of a propylene homopolymer and a propylene-based random copolymer, regulating the proportions of these polymers to be mixed.

In the present invention, the propylene polymer (C) is composed of at least one polymer selected from the group consisting of propylene homopolymers and propylene-based random copolymers.

Examples of the propylene-based random copolymers to be used as the propylene polymer (C) include random copolymers made up of propylene and at least one copolymerizable monomer selected from the group consisting of ethylene and α-olefins having 4 to 20 carbon atoms; the random copolymers include random copolymers made up of propylene and ethylene, random copolymers made up of propylene and at least one α-olefin having 4 to 20 carbon atoms, and random copolymers made up of propylene, ethylene and at least one α-olefin having 4 to 20 carbon atoms.

Examples of the α-olefin having 4 to 20 carbon atoms are the same as those of the α-olefin having 4 to 20 carbon atoms which is used for the propylene-random copolymers as the propylene polymer (A). 1-Butene, 1-pentene, 1-hexene and 1-octene are desirable, and more particularly, 1-butene and 1-hexene are more desirable from the viewpoint of transparency of oriented films.

Examples of the propylene-based random copolymers to be used as the propylene polymer (C) include propylene-ethylene random copolymers, propylene-α-olefin random copolymers and propylene-ethylene-α-olefin random copolymers. Examples of the propylene-α-olefin random copolymers and the propylene-ethylene-α-olefin random copolymers are the same as those of the propylene-α-olefin random copolymers and the propylene-ethylene-α-olefin random copolymers which are used as the propylene polymer (A). Preferred are propylene-ethylene random copolymers, propylene-1-butene random copolymers, propylene-1-hexene random copolymers, propylene-ethylene-1-butene random copolymers and propylene-ethylene-1-hexene random copolymers. Even more preferable ones from the viewpoint of transparency of oriented films include propylene-ethylene random copolymers, propylene-1-butene random copolymers and propylene-ethylene-1-butene random copolymers.

The ethylene content of the propylene-ethylene random copolymers to be used as the propylene polymer (C) is desirably 0.1 to 3 mole %, more desirably 0.2 to 2 mole % and, even more desirably 0.6 to 1.2 mole % from the viewpoint of transparency and durability of antistatic property of oriented films.

The α-olefin content of the propylene-α-olefin random copolymers to be used as the propylene polymer (C) is desirably 0.1 to 10 mole %, more desirably 0.2 to 8 mole % and, even more desirably 1 to 4 mole % from the viewpoint of transparency and durability of antistatic property of oriented films.

The combined content of ethylene and α-olefin in the propylene-ethylene-α-olefin random copolymers to be used as the propylene polymer (C) is desirably 0.1 to 10 mole %, more desirably 0.2 to 8 mole % and, even more desirably 0.4 to 2 mole % from the viewpoint of transparency and durability of antistatic property of oriented films.

From the viewpoint of transparency and durability of antistatic property of oriented films, propylene homopolymers are preferred.

From the viewpoints of transparency and durability of antistatic property of oriented films, the melting point, which means a temperature at which a highest endothermic peak appears in DSC measurement as previously mentioned, of the propylene polymer (C) is 150 to 170° C. (requirement (a)), desirably 155 to 166° C., and more desirably 157 to 165° C. If the melting point of the propylene polymer (C) is lower than 150° C., the transparency of oriented films may be insufficient, whereas if higher than 170° C., the durability of antistatic property of oriented films may be insufficient. It is possible to adjust the melt point of the propylene polymer (C) within the above ranges by (i) regulating the stereoregularity of the propylene polymer (C) through modification of a polymerization catalyst for use in the production of the propylene polymer (C), (ii) when the propylene polymer (C) is a propylene-based random copolymer, regulating the proportions of the monomers to be copolymerized, or (iii) when the propylene polymer (C) is a mixture of a propylene homopolymer and a propylene-based random copolymer, regulating the proportions of the polymers to be mixed.

From the viewpoints of printability and durability of antistatic property of oriented films, the CXS of the propylene polymer (C) is preferably 1 to 10% by weight, and more preferably 1 to 4% by weight.

The CXS of the propylene polymer (C) can be adjusted within the above ranges by (i) regulating the stereoregularity of the propylene polymer (C) through modification of a polymerization catalyst for use in the production of the propylene polymer (C), (ii) when the propylene polymer (C) is a propylene-based random copolymer, regulating the proportions of the monomers to be copolymerized, or (iii) when the propylene polymer (C) is a mixture of a propylene homopolymer and a propylene-based random copolymer, regulating the proportions of these polymers to be mixed.

From the viewpoint of reduction in stretching unevenness of oriented films and the viewpoint of transparency of oriented films, the molecular weight distribution (Mw/Mn) of the propylene polymer (C) is desirably 3 to 10, and more desirably 3.5 to 8. Note that Mw denotes the weight average molecular weight of the propylene polymer (C) and Mn denotes the number average molecular weight of the propylene polymer (C), both of which are determined by GPC measurement using polystyrene as calibration standards. The molecular weight distribution of the propylene polymer (C) can be adjusted within the above ranges by (i) regulating the stereoregularity of the propylene polymer (C) through modification of a polymerization catalyst for use in the production of the propylene polymer (C) or (ii) using a mixture of at least two propylene polymers selected from the group consisting of propylene homopolymers and propylene-based random copolymers and making the molecular weights of the propylene polymers different from each other.

The random copolymer (D) used in the present invention is composed of at least one copolymer selected from the group consisting of propylene-ethylene random copolymers, propylene-ethylene-α-olefin random copolymers and propylene-α-olefin random copolymers.

When the random copolymer (D) is a propylene-α-olefin random copolymer or a propylene-ethylene-α-olefin random copolymer, the α-olefin may, for example, be any of α-olefins having 4 to 20 carbon atoms.

Examples of the α-olefin having 4 to 20 carbon atoms to be used for the random copolymer (D) are the same as those of the α-olefin having 4 to 20 carbon atoms which is used for the propylene-random copolymers as the propylene polymer (A) or propylene polymer (C). 1-Butene, 1-pentene, 1-hexene and 1-octene are desirable. From the viewpoint of reduction in stretching unevenness or the viewpoint of heat resistance of oriented films, 1-butene and 1-hexene are more desirable.

Examples of propylene-α-olefin random copolymers or propylene-ethylene-α-olefin random copolymers to be used as the random copolymer (D) are the same as those of the propylene-α-olefin random copolymers or propylene-ethylene-α-olefin random copolymers to be used as the propylene polymer (A) or propylene polymer (C).

Preferable examples of the random copolymer (D) preferably include propylene-ethylene random copolymers, propylene-1-butene random copolymers, propylene-1-hexene random copolymers, propylene-ethylene-1-butene random copolymers and propylene-ethylene-1-hexene random copolymers. From the viewpoint of reduction in stretching unevenness or the viewpoint of heat resistance of oriented films, even more preferred are propylene-ethylene random copolymers, propylene-1-butene random copolymers and propylene-ethylene-1-butene random copolymers. In view of printability and durability of antistatic property of oriented films, propylene-ethylene random copolymers are particularly desirable.

From the viewpoints of printability and durability of antistatic property of oriented films, the propylene-ethylene random copolymers to be used as the random copolymer (D) has an ethylene content of 1 to 14 mole % (requirement (c)). The ethylene content desirably is 2 to 10 mole %, and more desirably 5 to 9 mole %. If the ethylene content is less than 1 mole %, the durability of antistatic property of oriented films may be insufficient, whereas if more than 14 mole %, the printability of oriented films may be insufficient.

From the viewpoints of printability and durability of antistatic property of oriented films, the propylene-α-olefin random copolymers to be used as the random copolymer (D) has an α-olefin content of 1 to 14 mole % (requirement (c)). The α-olefin content desirably is 3 to 10 mole %, and more desirably 4 to 8 mole %. If the α-olefin content is less than 1 mole %, the durability of antistatic property of oriented films may be insufficient, whereas if more than 14 mole %, the printability of oriented films may be insufficient.

From the viewpoints of printability and durability of antistatic property of oriented films, the propylene-ethylene-α-olefin random copolymers to be used as the random copolymer (D) has a combined content of ethylene and α-olefin of 1 to 14 mole % (requirement (c)). The combined content desirably is 3 to 11 mole %, and more desirably 4 to 10 mole %. If the combined content of ethylene and α-olefin is less than 1 mole %, the durability of antistatic property of oriented films may be insufficient, whereas if more than 14 mole %, the printability of oriented films may be insufficient.

From the viewpoints of printability and durability of antistatic property of oriented films, the melting point, which means a temperature at which a highest endothermic peak appears in DSC measurement as previously mentioned, of the random copolymer (D) is 120 to 149° C. (requirement (b)), desirably 125 to 145° C., and more desirably 128 to 135° C. If the melting point of the random copolymer (D) is lower than 120° C., the printability of oriented films may be insufficient, whereas if higher than 149° C., the durability of antistatic property of oriented films may be insufficient.

It is possible to adjust the melt point of the random copolymer (D) within the above ranges by (i) regulating the stereoregularity of the random copolymer (D) through modification of a polymerization catalyst for use in the production of the random copolymer (D) or (ii) regulating the proportions of monomers to be copolymerized.

From the viewpoints of transparency and durability of antistatic property of oriented films, the polypropylene resin composition (II) used in the present invention is a polypropylene resin composition comprising 30 to 80% by weight of a propylene polymer (C) and 20 to 70% by weight of a random copolymer (D) selected from the group consisting of random copolymers of propylene and ethylene, random copolymers of propylene and α-olefin and random copolymers of propylene, ethylene and α-olefin, wherein the amounts expressed in % by weight are each based on the combined weight of the components (C) and (D).

The content of the propylene polymer (C) is preferably 40 to 70% by weight, and more preferably 40 to 60% by weight. Conversely, the content of the random copolymer (D) is preferably 30 to 60% by weight, and more preferably 40 to 60% by weight.

When the propylene polymer (C) is a propylene homopolymer or a propylene-ethylene random copolymer and the random copolymer (D) is a propylene-ethylene random copolymer, the total content of ethylene in the polypropylene resin composition (II) is preferably 0.2 to 9.8 mole %, more preferably 1.0 to 8.0 mole %, and even more preferably 2.0 to 6.0 mole % from the viewpoints of printability and durability of antistatic property of oriented films.

When the propylene polymer (C) is a propylene homopolymer or a propylene-α-olefin random copolymer and the random copolymer (D) is a propylene-α-olefin random copolymer, the total content of α-olefin in the polypropylene resin composition (II) is preferably 0.2 to 9.8 mole %, more preferably 2.0 to 9.5 mole %, and even more preferably 3.0 to 9.0 mole % from the viewpoints of printability and durability of antistatic property of oriented films.

When the propylene polymer (C) is a propylene homopolymer and the random copolymer (D) is a propylene-ethylene-α-olefin random copolymer, the combined content of ethylene and α-olefin in the polypropylene resin composition (II) is preferably 0.2 to 9.8 mole %, more preferably 1.5 to 9.0 mole %, and even more preferably 2.5 to 8.0 mole % from the viewpoints of printability and durability of antistatic property of oriented films.

When the propylene polymer (C) is a propylene-ethylene-α-olefin random copolymer and the random copolymer (D) is a propylene-ethylene-α-olefin random copolymer, the combined content of ethylene and α-olefin in the polypropylene resin composition (II) is preferably 0.2 to 9.8 mole %, more preferably 1.5 to 9.0 mole %, and even more preferably 2.5 to 8.0 mole % from the viewpoints of printability and durability of antistatic property of oriented films.

When the propylene polymer (C) is a propylene-ethylene random copolymer and the random copolymer (D) is a propylene-α-olefin random copolymer, the combined content of ethylene and α-olefin in the polypropylene resin composition (II) is preferably 0.2 to 9.8 mole %, more preferably 1.5 to 9.0 mole %, and even more preferably 2.5 to 8.0 mole % from the viewpoints of printability and durability of antistatic property of oriented films.

When the propylene polymer (C) is a propylene-ethylene random copolymer and the random copolymer (D) is a propylene-ethylene-α-olefin random copolymer, the combined content of ethylene and α-olefin in the polypropylene resin composition (II) is preferably 0.2 to 9.8 mole %, more preferably 1.5 to 9.0 mole %, and even more preferably 2.5 to 8.0 mole % from the viewpoints of printability and durability of antistatic property of oriented films.

When the propylene polymer (C) is a propylene-α-olefin random copolymer and the random copolymer (D) is a propylene-ethylene random copolymer, the combined content of ethylene and α-olefin in the polypropylene resin composition (II) is preferably 0.2 to 9.8 mole %, more preferably 1.5 to 9.0 mole %, and even more preferably 2.5 to 8.0 mole % from the viewpoints of printability and durability of antistatic property of oriented films.

When the propylene polymer (C) is a propylene-α-olefin random copolymer and the random copolymer (D) is a propylene-ethylene-α-olefin random copolymer, the combined content of ethylene and α-olefin in the polypropylene resin composition (II) is preferably 0.2 to 9.8 mole %, more preferably 1.5 to 9.0 mole %, and even more preferably 2.5 to 8.0 mole % from the viewpoints of printability and durability of antistatic property of oriented films.

When the propylene polymer (C) is a propylene-ethylene-α-olefin random copolymer and the random copolymer (D) is a propylene-ethylene random copolymer, the combined content of ethylene and α-olefin in the polypropylene resin composition (II) is preferably 0.2 to 9.8 mole %, more preferably 1.5 to 9.0 mole %, and even more preferably 2.5 to 8.0 mole % from the viewpoints of printability and durability of antistatic property of oriented films.

When the propylene polymer (C) is a propylene-ethylene-α-olefin random copolymer and the random copolymer (D) is a propylene-α-olefin random copolymer, the combined content of ethylene and α-olefin in the polypropylene resin composition (II) is preferably 0.2 to 9.8 mole %, more preferably 1.5 to 9.0 mole %, and even more preferably 2.5 to 8.0 mole % from the viewpoints of printability and durability of antistatic property of oriented films.

The melt flow rate (MFR) of the polypropylene resin composition (II) is desirably 0.1 to 20 g/10 min., more desirably 3 to 10 g/10 min., and even more desirably 4 to 8 g/10 min. from the viewpoint of simultaneous achievement of good fluidity at the time of extrusion processing and reduction in stretching unevenness of oriented films. The MFR is measured at a temperature of 230° C. and a load of 21.18 N in accordance with Condition No. 14 provided in JIS K 7210.

From the viewpoint of simultaneous achievement of good heat resistance and reduction in stretching unevenness of oriented films, the melting point, which means a temperature at which a highest endothermic peak appears in DSC measurement as previously mentioned, of the polypropylene resin composition (II) is preferably 140 to 170° C., more preferably 150 to 166° C., and even more particularly 152 to 165° C. The melting point of the propylene resin composition (II) can be adjusted within the above ranges through the adjustment of the melting point and/or the content of each of the propylene polymer (C) and the random copolymer (D) to be mixed.

The CXS of the polypropylene resin composition (II) is desirably 0.1 to 30% by weight, more desirably 1 to 20% by weight, and even more desirably 2 to 15% by weight from the viewpoint of simultaneous achievement of good durability of antistatic property and good heat resistance. The CXS of the propylene resin composition (II) can be adjusted within the above ranges through the adjustment of the CXS and/or the content of each of the propylene polymer (C) and the random copolymer (D) to be mixed.

The polypropylene resin composition (I) and the polypropylene resin composition (II) may contain additives and additional resins. Examples of such additives include antioxidants, neutralizing agents, UV absorbers, nucleating agents, pressure-sensitive adhesives, anti-blocking agents and inorganic or organic fillers. The polypropylene resin composition (II) may also contain a surfactant.

In a differential scanning calorimetry (DSC) measurement, a sheet 0.5 mm in thickness is used which is obtained by subjecting a polymeric material (propylene polymer (A), propylene polymer (C) random copolymer (D), polypropylene resin composition (I) or polypropylene resin composition (II)) to hot press molding including the following operations (1) through (4).

(1) Preheating at 230° C. for five minutes without application of load.
(2) Increasing the pressure up to 50 kgf/cm$^2$ in three minutes.
(3) Keeping the pressure at 50 kgf/cm$^2$ for two minutes.
(4) Cooling the pressed sheet to 30° C. in five minutes under a pressure of 30 kgf/cm$^2$.

Alternatively, layers taken from a biaxially oriented multilayer film may be used.

The DSC measurement is carried out specifically in the method described below by use of a differential scanning calorimeter (Model DSC-7, manufactured by PerkinElmer Inc.).

A specimen weighing about 10 mg taken from the hot pressed sheet is subjected to a thermal hysteresis including steps (i) through (vi) shown below under a nitrogen atmosphere. During step (vi), a fusion curve is produced. In the resulting fusion curve, a temperature (° C.) at which a highest endothermic peak appears is determined. The temperature is used as a melting point (Tm).

(i) Holding a sample at 220° C. for five minutes.
(ii) Cooling the sample from 220° C. to 150° C. at a rate of 300° C./min.
(iii) Holding the sample at 150° C. for one minute.
(iv) Cooling the sample from 150° C. to 50° C. at a rate 5° C./min.
(v) Holding the sample at 50° C. for one minute.
(vi) Heating the sample from 50° C. to 180° C. at a rate of 5° C./min.

The method for prepare the polypropylene resin composition (II) may be [1] a method which comprises producing a propylene polymer (C) and a random copolymer (D) separately by polymerization and then mixing the resulting polymer (C) and random copolymer (D) together, or [2] a method which comprises producing a propylene polymer (C) and a random copolymer (D) by multistage polymerization including two or more stages.

Method [1]

For the separate preparation of the propylene polymer (C) and the random copolymer (D) by polymerization, conventional polymerization techniques may be applied, for example, solvent polymerization, which is carried out in the presence of inert solvent, bulk polymerization, which is carried out in the presence of liquid monomer, and gas phase polymerization, which is carried out in the presence of substantially no liquid medium. Vapor phase polymerization is preferred. In addition, polymerization methods composed of a combination of two or more of the above-mentioned polymerization techniques or methods having two or more polymerization stages may also be applied.

The method for mixing the separately prepared propylene polymer (C) and random copolymer (D) may be any method by which the propylene polymer (C) and the random copolymer (D) can be dispersed uniformly. Examples of such a method include the following methods (1) through (4).

(1) A method which comprises mixing the propylene polymer (C) and the random polymer (D) in a mixing device such as a ribbon blender, a Henschel mixer and a tumbler mixer and melt-kneading the resulting mixture in an extruder or the like.
(2) A method which comprises melt-kneading the propylene polymer (C) and the random copolymer (D) separately to form their pellets separately, followed by mixing the pelletized propylene polymer (C) and the pelletized random copolymer (D) together in a mixing device and melt-kneading the mixture in an extruder or the like in a manner similar to that in the above method (1).
(3) A method which comprises melt-kneading the propylene polymer (C) and the random copolymer (D) separately to form their pellets separately, followed by dry-blending the pelletized propylene polymer (C) and the pelletized random copolymer (D) together and mixing the resulting blend directly in a film forming machine.
(4) A method which comprises melt-kneading the propylene polymer (C) and the random copolymer (D) separately to form their pellets separately, followed by feeding the pelletized propylene polymer (C) and the pelletized random copolymer (D) separately to an extruder of a film forming machine to mixing the pellets together.

Another possible method comprises preparing a masterbatch which contains 100 parts by weight of the random polymer (D) and 1 to 99 parts by weight of the polymer (C), and mixing the masterbatch with an appropriate amount of the polymer (C) or random copolymer (D) so that the concentrations of both components become predetermined values.

Method [2]

In the method for producing the propylene polymer (C) and the random copolymer (D) by multistage polymerization including two or more stages, conventional polymerization techniques may be applied to the preparations of the propylene polymer (C) and the random copolymer (D). One possible example is a method in which two or more polymerization stages are provided, each stage being conducted by any of solvent polymerization, bulk polymerization and gas phase polymerization and the propylene polymer (C) and the random copolymer (D) are each produced in any stage by polymerization.

The propylene resin composition obtained by the multistage polymerization may be further mixed, for example, by melt-kneading of the composition in an extruder or the like. At the time of the mixing, some additives such as antioxidants, neutralizing agents, anti-blocking agents, inorganic or organic fillers may be added.

As the catalysts for use in the polymerizations for producing the propylene polymer (C) and the random copolymer (D), catalysts for stereoregulated polymerization of propylene are used both in the case of producing them separately and in the case of producing them by multistage polymerization.

Examples of the catalysts for stereoregulated polymerization of propylene include titanium trichloride catalysts, metallocene catalysts and catalyst systems obtained by combining an organoaluminum compound and, if needed, a third component such as an electron-donating compound with a solid catalyst component such as a Ti—Mg catalyst composed of titanium, magnesium, halogen and an electron donor.

Preferred are catalyst systems prepared by combining a solid catalyst compound composed of titanium, magnesium, halogen and an electron donor, an organoaluminum compound and an electron-donating compound, for example, catalyst systems disclosed in JP-A Nos. 61-218606, 61-287904, and 7-216017.

Biaxially oriented multilayer polypropylene films in accordance with the present invention have a structure which comprises a substrate layer comprising the aforementioned polypropylene resin composition (I) and a layer comprising the aforementioned polypropylene resin composition (II), the layer comprising the polypropylene resin composition (II) being laminated on at least one surface of the substrate layer.

The content of the polypropylene resin composition (I) in the substrate layer is desirably 50% by weight or more, are more desirably 90% by weight or more.

The content of the polypropylene resin composition (II) in the layer containing the polypropylene resin composition (II) is desirably 50% by weight or more, are more desirably 90% by weight or more.

Methods of film forming and stretching which can be used for the production of biaxially oriented multilayer polypropylene films in accordance with the present invention include a transverse uniaxial stretching process, a successive biaxial stretching process, a simultaneous biaxial stretching process, and a tubular biaxial stretching process. These stretching processes are explained below.

Transverse Uniaxial Stretching Process

Polypropylene resin compositions (I) and (II) are extruded and combined in multilayer through a T die using an extruder. The extrudate is then cooled and solidified over chill rolls to form a sheet. The resulting sheet is held at both lateral sides thereof with chucks arranged in two parallel lines along the running direction. In an oven including a preheating zone, a stretching zone and a heat treating zone, the sheet is stretched laterally by enlarging the distance between the parallelly arranged chucks and then, if needed, is subjected to corona treatment or the like. Thereafter, the resulting film is wound up.

Successive Biaxial Stretching Process

Polypropylene resin compositions (I) and (II) are extruded in multilayer through a T die using an extruder. The extrudate is then cooled and solidified over chill rolls to form a sheet. The resulting sheet is then stretched longitudinally while being preheated over a series of heating rolls. The longitudinally stretched sheet is held at both lateral sides thereof with chucks arranged in two parallel lines along the running direction. In an oven including a preheating zone, a stretching zone and a heat treating zone, the sheet is stretched laterally by enlarging the distance between the parallelly arranged chucks and then, if needed, is subjected to corona treatment or the like. Thereafter, the resulting film is wound up.

The melting temperature of the polypropylene resin compositions (I) and (II) in the successive biaxial stretching process are normally 230 to 290° C. The longitudinal stretching temperature is normally 130 to 150° C. and the longitudinal stretch ratio is normally 4 times to 6 times. The transverse stretching ratio is normally 8 times to 10 times.

Simultaneous Biaxial Stretching Process

Polypropylene resin compositions (I) and (II) are extruded in multilayer through a T die using an extruder. The extrudate is then cooled and solidified over chill rolls to form a sheet. The resulting sheet is held at both lateral sides thereof with chucks arranged in two parallel lines along the running direction. In an oven including a preheating zone, a stretching zone and a heat treating zone, the sheet is stretched simultaneously in both the longitudinal and transverse directions by enlarging the distance between the parallelly arranged chucks and also enlarging the distance between the chucks in each line. Then, the stretched film is, if needed, subjected to corona treatment or the like. Thereafter, the resulting film is wound up.

Tubular Biaxial Stretching Process

Polypropylene resin compositions (I) and (II) are extruded in multilayer through a circular die using an extruder. The extrudate is then cooled and solidified in a water bath to form a tube. Subsequently, the resulting tube is preheated in an oven or over a series of hot rolls and then stretched in the running direction by being passed through low-speed nip rolls and being wound up with high-speed nip rolls. During this operation, the tube is also stretched laterally by being expanded by the action of the inner pressure of the air enclosed between the low-speed nip rolls and the high-speed nip rolls. The stretched film passed through high-speed nip rolls is heat treated in an oven or over a series of hot rolls. The film is then, if needed, subjected to corona treatment or the like. Thereafter, the resulting film is wound up.

Biaxially oriented multilayer polypropylene films of the present invention may be subjected to surface treatment such as corona discharge treatment, flame treatment and plasma treatment, if necessary. From the viewpoint of achieving a high level of durability of antistatic property, it is desirable to conduct the corona discharge treatment so that the surface of the film treated has a wet tension of 35 dyne/cm or more. The surface treatment may be applied to either one side or both sides of a film. From the viewpoint of simultaneous achievement of a high level of printability and a high level of durability of antistatic property, it is desirable to apply the surface treatment to both sides of a film.

Biaxially oriented multilayer polypropylene films of the present invention normally have a thickness of 10 to 100 μm, and desirably 12 to 30 μm.

The thickness of the layer comprising the polypropylene resin composition (II) in biaxially oriented multilayer polypropylene films of the present invention is normally 0.1 to 10 μm, and desirably 0.3 to 3 μm.

The thickness of the substrate layer comprising the polypropylene resin composition (I) in biaxially oriented multilayer polypropylene films of the present invention is normally 9.9 to 90 μm, and desirably 11 to 27 μm.

Biaxially oriented multilayer polypropylene films of the present invention can be used for packaging various types of items such as food products (confections, cakes, liquid food products, etc.), clothes and other sundries.

EXAMPLES

Hereinafter, the present invention will be illustrated by making reference to Examples and Comparative Examples, which do not limit the scope of the present invention in any way.

[Methods for Measuring Physical Properties]

[1] Melt Flow Rate (MFR; unit: g/10 min.)

The melt flow rate was measured at a temperature of 230° C. and a load of 21.18 N according to the method of Condition No. 14 provided in JIS K 7210.

[2] Melting Point: Tm (° C.)

For each test material, a sheet 0.5 mm in thickness was prepared by hot press molding including the following operations (1) through (4).

(1) Preheating at 230° C. for five minutes without application of load.
(2) Increasing the pressure up to 50 kgf/cm² in three minutes.
(3) Keeping the pressure at 50 kgf/cm² for two minutes.
(4) Cooling the pressed sheet to 30° C. in five minutes under a pressure of 30 kgf/cm².

In the measurement, a differential scanning calorimeter (Model DSC-7, manufactured by PerkinElmer Inc.) was used. A specimen weighing about 10 mg taken from the hot pressed sheet was subjected to a thermal hysteresis including steps (i) through (vi) shown below under a nitrogen atmosphere. During step (vi), a fusion curve was produced. In the resulting fusion curve, a temperature (° C.) at which a highest endothermic peak appears was determined. The temperature was used as a melting point (Tm).

(i) Holding a sample at 220° C. for five minutes.
(ii) To cooling the sample from 220° C. to 150° C. at a rate of 300° C./min.
(iii) Holding the sample at 150° C. for one minute.
(iv) Cooling the sample from 150° C. to 50° C. at a rate 5° C./min.
(v) Holding the sample at 50° C. for one minute.
(vi) Heating the sample from 50° C. to 180° C. at a rate of 5° C./min.

[3] Cold Xylene-Soluble Fraction Content (CXS; unit: % by weight)

First, 10 g of sample was dissolved in 1000 ml of boiling xylene and then the solution was cooled to 50° C. slowly. Subsequently, the solution was cooled to 20° C. in iced water under stirring and then was left stand at 20° C. overnight. The polymer precipitated was removed by filtration and then xylene was removed by distillation from the filtrate. The distillation residue was dried under reduced pressure at 60° C. and then recovered. The weight, W (g), of the recovery was measured. The value of the formula (W/10)×100 was used as a cold xylene-soluble fraction content.

[4] Comonomer Content (unit: mole %))

The comonomer content was determined through quantitative measurement using IR spectrum, the method of the measurement being disclosed in Macromolecule Handbook, pages 616-619, published by Kinokuniya Co. in 1995.

[5] Stretching Unevenness

A film was visually observed. The condition of uneven stretch in the film was rated in accordance with the following criteria: symbol "o" (excellent) for a condition almost no uneven stretch is recognized; symbol "Δ" (good) for a condition slight uneven stretch is recognized; and symbol "x" (poor) for a condition uneven stretch is recognized throughout the film.

[6] Transparency

As a measure of transparency, the Haze (%) of a film was determined in accordance with ASTM D 1103. The smaller the Haze value, the better in transparency the film is.

[7] See-Through Feeling

Using a light scattering intensity tester (LSI tester) manufactured by Toyo Seiki Seisaku-sho Co., Ltd., the intensity of light scattered by a film within ranges of ±0.4° to ±1.2°, namely LSI, was measured. The LSI was used as a measure of see-through feeling of the film. The smaller the LSI value, the better in see-through feeling the film is.

[8] Print Peeling Area Ratio (printability; unit:%)

2 ml of ink (polyamide/nitrocellulose-based ink manufactured by Sakata Inx Corp.; trade name: DA Cyan 800 for G-cellophane) was dropped on a film and was spread as wide as 30 mm×150 mm with a Meyer bar with a roughness of 0.1 mm. The film was heated at 60° C. for one hour. Subsequently, a cellophane tape was stuck to the printed portion of the film and then peeled off. The ratio of the area where print was removed with the tape, which is called "print peeling area ratio," was calculated from the following equation (1). The smaller the print peeling area ratio, the better in printability the film is.

Print peeling area ratio=(Area of a portion where print was peeled off)/(Area of the entire portion where cellophane tape was stuck) (1)

[9] 60° C. Dynamic Friction Coefficient (Hot Slip Property)

In a thermostatic chamber at a relative humidity of 65% RH, the dynamic friction coefficient of a film was measured in accordance with ASTM D1894-63 at a film temperature 40° C. The dynamic friction coefficient was used as a measure of hot slip property of the film. The smaller the dynamic friction coefficient, the better in hot slip property the film is.

[10] Young's Modulus (Rigidity, unit: kg/cm$^2$)

A specimen 20 mm in width and 160 mm in length was taken from a film so that the length of the specimen matched the longitudinal direction (MD) of the film. Likewise, another specimen 20 mm in width and 120 mm in length was taken from the same film so that the length of the specimen matched the transverse direction (TD) of the film. For each specimen, an S-S curve was produced using a tensile tester under conditions including a chuck spun of 60 mm and a tensile rate of 5 mm/min. Thus, an initial modulus (Young's modulus) was determined. The greater the Young's modulus, the better in rigidity the film is.

[11] Heat Shrinkage (Heat Resistance; unit: %)

A specimen 30 cm in the MD and 20 cm in the TD was taken from a film. On the specimen, two pairs of parallel straight lines at a distance of 10 cm were drawn, one pair extending along the MD and the other along the TD. The specimen was left standing for five minutes in an oven at 120° C. and then cooled at room temperature for 30 minutes.

Thereafter, the distance between the parallel lines was measured for each pair of parallel lines. The heat shrinkage was calculated using the following equation (2). The smaller the heat shrinkage, the better in heat resistance the film is.

Heat shrinkage=100×{(10−distance between parallel lines after heating (cm))/10} (2)

[12] Durability of Antistatic Property

In a temperature/humidity-controlled room (temperature: 23° C., humidity: 50%), a specimen with a size 40 mm×40 mm was electrified with at an applied voltage of 10 kV for one minute and then a time (unit: second) required for the static voltage to be reduced by one half (half decay period) was measured using a Static Honestmeter manufactured by Shishido Electrostatic Co., Ltd. The smaller this value, the better the surface conductivity and the antistatic property are.

The surface of the film was washed with running water for one minute and then the film was left standing in a thermo-hygrostat at a temperature 40° C. and a humidity 80% for 24 hours. Measurement of a half decay period was repeated three times for one film and the results of the measurements were averaged. The smaller the value, the better in durability of antistatic property the film is.

[Production of Propylene Polymer (A), Propylene Polymer (C) and Random Copolymer (D)]

Powders of propylene polymers (A), propylene polymers (C) and random copolymers (D) used in Examples and Comparative Examples were obtained by polymerizations using propylene in the presence of a catalyst system disclosed in JP-A No. 7-216017.

Physical properties of the resulting propylene polymers (A), propylene polymers (C) and random copolymers (D) are shown in Table 1.

Example 1

[Preparation of Polypropylene Resin Composition (I-1) for Substrate]

A powder of propylene polymer A1 (100 parts by weight), a neutralizing agent (trade name: DHT-4C, manufactured by Kyowa Chemical Industry Co., Ltd.) (0.01 part by weight), a stabilizer (trade name: Irganox 1010, manufactured by Ciba Specialty Chemicals) (0.15 parts by weight) and another stabilizer (trade name: Irganox 168, manufactured by Ciba Specialty Chemicals) (0.15 parts by weight), a mixture (1.0 part by weight) of stearyl diethanolamine, alkyl diethanolamine monoester and stearyl diethanolamine diester as surfactant, and higher fatty acid ester monoglyceride (0.2 part by weight) were combined, mixed in a Henschel mixer, and then pelletized at 220° C. by means of a 65 mmφ extruder. Thus, pellets of polypropylene resin composition (I-1) were formed. Physical properties of the polypropylene resin composition (I-1) were determined and the results are shown in Table 2.

[Preparation of Polypropylene Resin Composition (II-1) for Surface Layers]

A powder of propylene polymer (C-1) (50 parts by weight), a powder of random copolymer of propylene and ethylene (D-1) (50 parts by weight), a neutralizing agent (trade name: DHT-4C, manufactured by Kyowa Chemical Industry Co., Ltd.) (0.01 part by weight), a stabilizer (trade name: Irganox 1010, manufactured by Ciba Specialty Chemicals) (0.15 parts by weight) and another stabilizer (trade name: Irganox 168, manufactured by Ciba Specialty Chemicals) (0.15 parts by weight), and a mixture (1.0 part by weight) of stearyl diethanolamine, alkyl diethanolamine monoester and stearyl diethanolamine diester as surfactant, higher fatty acid ester monoglyceride (0.2 part by weight), and an antiblocking agent (trade name: MB134-2, manufactured by Sumitomo Chemical Co., Ltd.) were combined, mixed in a Henschel mixer, and then pelletized at 220° C. by means of a 65 mmφ extruder. Thus, pellets of polypropylene resin composition (II-1) were formed. Physical properties of the polypropylene resin composition (II-1) were determined and the results are shown in Table 2.

[Production of Oriented Film]

The polypropylene resin composition (I-1) for forming a substrate and the polypropylene resin composition (II-1) for forming surface layers were separately melt-kneaded in separate extruders at resin temperatures 260° C. and 230° C., respectively, and then were fed to one coextrusion T-die. The resin compositions were extruded through the T-die to form a two-species three-layer structure: surface layer/substrate layer/surface layer. The extrudate was rapidly cooled over a 30° C. chill roll to solidify. Thus, a cast sheet 1 mm in thickness was obtained.

The cast sheet obtained in the above-mentioned manner was preheated at 115° C., and then stretched longitudinally at a stretch ratio of 5 times at a stretching temperature of 120° C. using the peripheral speed difference between rolls. Subsequently, the stretched sheet was preheated at 166° C. in a preheating oven and then stretched transversely at a stretch ratio of 8 times at a stretching temperature of 152° C. in an oven. Thereafter, the resulting film was subjected to heat treatment at 165° C. and then to corona treatment to both surfaces so that the treated surfaces had a wet tension of 40 dyne/cm. Thus, a biaxially oriented multilayer film having layer thicknesses 1 μm/23 μm/1 μm was produced, which was then wound up by a winder. The results of the physical property evaluation of the resulting film are shown in Tables 3 and 4.

Example 2

The operations of Example 1 were repeated except using 70 parts by weight of the powder of propylene polymer (C-1) and 30 parts by weight of the powder of propylene-ethylene random copolymer (D-1). Physical properties of the polypropylene resin composition (II-1) for surface layers are shown in Table 2. Using polypropylene resin composition (II-2) for surface layers, a film was prepared and evaluated in the same manners as those in Example 1. The results of the physical property evaluation of the resulting film are shown in Tables 3 and 4.

Example 3

The operations of Example 1 were repeated except using 30 parts by weight of the powder of propylene polymer (C-1) and 70 parts by weight of the powder of propylene-ethylene random copolymer (D-1). Physical properties of the polypropylene resin composition (II-3) for surface layers are shown in Table 2. Using polypropylene resin composition (II-3) for surface layers, a film was prepared and evaluated in the same manners as those in Example 1. The results of the physical property evaluation of the resulting film are shown in Tables 3 and 4.

Example 4

The operations of Example 1 were repeated except using a powder of propylene-ethylene-1-butene random copolymer (D-2) in place of the powder of propylene-ethylene random copolymer (D-1). Physical properties of the polypropylene resin composition (II-4) for surface layers are shown in Table 2. Using polypropylene resin composition (II-4) for surface layers, a film was prepared and evaluated in the same manners as those in Example 1. The results of the physical property evaluation of the resulting film are shown in Tables 3 and 4.

Example 5

The operations of Example 4 were repeated except using 70 parts by weight of the powder of propylene polymer (C-1) and 30 parts by weight of the powder of propylene-ethylene-1-butene random copolymer (D-2). Physical properties of the polypropylene resin composition (II-5) for surface layers are shown in Table 2. Using polypropylene resin composition (II-5) for surface layers, a film was prepared and evaluated in the same manners as those in Example 1. The results of the physical property evaluation of the resulting film are shown in Tables 3 and 4.

Example 6

The operations of Example 1 were repeated except using a powder of propylene-ethylene-1-butene random copolymer (D-3) in place of the powder of propylene-ethylene random copolymer (D-1). Physical properties of the polypropylene resin composition (II-6) for surface layers are shown in Table 2. Using polypropylene resin composition (II-6) for surface layers, a film was prepared and evaluated in the same manners as those in Example 1. The results of the physical property evaluation of the resulting film are shown in Tables 3 and 4.

Comparative Example 1

The operations of Example 1 were repeated except using 100 parts by weight of the powder of propylene polymer (C-1) in place of the combination of 50 parts by weight of the powder of propylene polymer (C-1) and 50 parts by weight of the powder of propylene-ethylene random copolymer (D-1). Physical properties of the polypropylene resin composition (II-7) for surface layers are shown in Table 2. Using the resulting polypropylene resin composition (II-7) for surface layers, a film was prepared and evaluated in the same manners as those in Example 1 except stretching an extrudate in the transverse direction at a stretching temperature of 152° C. The results of the physical property evaluation of the resulting film are shown in Tables 3 and 4.

Comparative Example 2

The operations of Example 1 were repeated except using 100 parts by weight of the powder of propylene-ethylene random copolymer (D-1) in place of the combination of 50 parts by weight of the powder of propylene polymer (C-1) and 50 parts by weight of the powder of propylene-ethylene random copolymer (D-1). Physical properties of the polypropylene resin composition (II-8) for surface layers are shown in Table 2. Using polypropylene resin composition (II-8) for surface layers, a film was prepared and evaluated in the same manners as those in Comparative Example 1.

The results of the physical property evaluation of the resulting film are shown in Tables 3 and 4.

Comparative Example 3

The operations of Example 1 were repeated except using a powder of propylene-1-butene random copolymer (D-4) in place of the powder of propylene-ethylene random copolymer (D-1). Physical properties of the polypropylene resin composition (II-9) for surface layers are shown in Table 2. Using polypropylene resin composition (II-9) for surface layers, a film was prepared and evaluated in the same manners as those in Example 1. The results of the physical property evaluation of the resulting film are shown in Tables 3 and 4.

TABLE 1

| Code | Ethylene content (mole %) | 1-Butene content (mole %) |
|---|---|---|
| A-1 | 1.1 | 0 |
| C-1 | 1.0 | 0 |
| D-1 | 8.0 | 0 |
| D-2 | 6.0 | 3.3 |
| D-3 | 3.3 | 5.4 |
| D-4 | 0 | 17.4 |

TABLE 2

| Code | Component and Content Ratio | | MFR (g/10 min) | Tm (° C.) | CXS (% by weight) |
|---|---|---|---|---|---|
| I-1 | A-1 (100) | — | 2.7 | 156.1 | 3.7 |
| II-1 | C-1 (50) | D-1 (50) | 4.1 | 159.3 | 4.5 |
| II-2 | C-1 (70) | D-1 (30) | 4.0 | 154.4 | 4.0 |
| II-3 | C-1 (30) | D-1 (70) | 4.5 | 156.9 | 5.4 |
| II-4 | C-1 (50) | D-2 (50) | 5.4 | 159.2 | 4.2 |
| II-5 | C-1 (70) | D-2 (30) | 4.6 | 154.1 | 3.7 |
| II-6 | C-1 (50) | D-3 (50) | 4.5 | 159.5 | 3.1 |
| II-7 | C-1 (100) | — | 4.3 | 157.5 | 3.1 |
| II-8 | D-1 (100) | — | 6.0 | 132.1 | 7.4 |
| II-9 | C-1 (50) | D-4 (50) | 4.2 | 159.5 | 6.8 |

TABLE 3

| | Substrate | Surface layer | Transverse Stretching Temperature (° C.) | Stretching Unevenness | Haze (%) | LSI (%) | Print Peeling Area Ratio |
|---|---|---|---|---|---|---|---|
| Example 1 | I-1 | II-1 | 152 | ○ | 1.9 | 1.4 | 40 |
| Example 2 | I-1 | II-2 | 152 | ○ | 1.6 | 1.5 | 0 |
| Example 3 | I-1 | II-3 | 152 | ○ | 2.6 | 1.8 | 30 |
| Example 4 | I-1 | II-4 | 152 | ○ | 1.4 | 1.4 | 40 |
| Example 5 | I-1 | II-5 | 152 | ○ | 1.6 | 1.6 | 10 |
| Example 6 | I-1 | II-6 | 152 | ○ | 1.4 | 1.4 | 5 |
| Comparative Example 1 | I-1 | II-7 | 157 | ○ | 1.7 | 2.0 | 0 |
| Comparative Example 2 | I-1 | II-8 | 157 | ○ | 3.6 | 6.8 | 5 |
| Comparative Example 3 | I-1 | II-9 | 152 | ○ | 2.0 | 1.4 | 80 |

TABLE 4

| | 60° Dynamic friction coefficient | Young's modulus MD/TD (MPa/MPa) | Thermal shrinkage MD/TD (%/%) | Half decay period after rinsing (second) |
|---|---|---|---|---|
| Example 1 | 0.58 | 1790/3620 | 3.8/3.4 | 6 |
| Example 2 | 0.92 | 1790/3460 | 4.0/3.0 | 2 |
| Example 3 | 0.37 | 1740/3500 | 3.9/3.9 | 4 |
| Example 4 | 0.45 | 1740/3600 | 3.9/3.5 | 16 |
| Example 5 | 0.71 | 1780/3680 | 3.8/3.6 | 65 |
| Example 6 | 0.46 | 1760/3610 | 2.6/3.5 | 105 |
| Comparative Example 1 | 0.48 | 1940/3610 | 3.3/1.3 | 269 |
| Comparative Example 2 | 5.5 or more | 1710/3280 | 3.2/1.7 | 4 |
| Comparative Example 3 | 0.61 | 1770/3440 | 3.9/2.8 | 5 |

Each of the oriented films of Examples 1 to 6 is a biaxially oriented multilayer polypropylene film can be obtained in which no stretching unevenness is recognized and which is superior in transparency, see-through feeling, hot slip property, rigidity, heat resistance, durability of antistatic property, and printability.

It is shown that the film of Comparative Example 1, which contains no random copolymer (D), exhibits insufficient durability of antistatic property. The film of Comparative Example 2, which contained no propylene polymer (C), is insufficient in transparency, see-through feeling and hot slip property. The film of Comparative Example 3, which contains too much random copolymer (D), is insufficient in printability.

What is claimed is:

1. A biaxially oriented multilayer polypropylene film which comprises a substrate layer comprising a polypropylene resin composition (I) and a layer comprising a polypropylene resin composition (II), the layer comprising the polypropylene resin composition (II) being laminated on at least one surface of the substrate layer;

wherein the polypropylene resin composition (I) is a polypropylene resin composition comprising 97 to 99.97% by weight of a propylene polymer (A) and 0.03 to 3% by weight of a surfactant (B), wherein the amounts expressed in % by weight are each based on the combined weight of the components (A) and (B); and the polypropylene resin composition (II) is a polypropylene resin composition comprising 30 to 80% by weight of a propylene polymer (C) having a melt point of 150 to 170° C. and 20 to 70% by weight of a random copolymer (D) being selected from the group consisting of random copolymers of propylene and ethylene, random copolymers of propylene and α-olefin and random copolymers of propylene, ethylene and α-olefin, wherein the amounts expressed in % by weight are each based on the combined weight of the components (C) and (D); the random copolymer (D) having a melt point of 120 to 149° C. and having a content of ethylene, a content of α-olefin or a combined content of ethylene and α-olefin of 1 to 14 mole %.

* * * * *